(12) United States Patent
Walter

(10) Patent No.: US 8,485,389 B2  
(45) Date of Patent: Jul. 16, 2013

(54) ASSEMBLY WITH VAPOR VENT VALVE AND LIQUID TRAP FOR STATIC LEAK PREVENTION IN VAPOR CONTROL SYSTEM

(75) Inventor: Stefan Walter, Karlsruhe (DE)

(73) Assignee: Eaton Corporation, Cleveland, OH (US)

( * ) Notice: Subject to any disclaimer, the term of this patent is extended or adjusted under 35 U.S.C. 154(b) by 37 days.

(21) Appl. No.: 13/162,624

(22) Filed: Jun. 17, 2011

(65) Prior Publication Data

US 2012/0318814 A1 Dec. 20, 2012

(51) Int. Cl.
B65D 25/00 (2006.01)

(52) U.S. Cl.
USPC ........ 220/749; 220/567.2; 220/562; 220/746; 137/587; 137/43

(58) Field of Classification Search
USPC .............. 220/567.2, 749, 562, 586, 746, 745, 220/582; 137/587, 43, 202; 123/519
See application file for complete search history.

(56) References Cited

U.S. PATENT DOCUMENTS

| | | | |
|---|---|---|---|
| 3,662,780 A * | 5/1972 | Marsh | 220/586 |
| 6,276,387 B1 * | 8/2001 | Pachciarz et al. | 137/43 |
| 6,302,137 B1 * | 10/2001 | Devall | 137/202 |
| 6,883,500 B2 * | 4/2005 | Powell et al. | 123/519 |
| 6,895,989 B2 * | 5/2005 | Olshanetsky et al. | 137/202 |
| 7,385,163 B2 * | 6/2008 | Vorenkamp et al. | 219/617 |
| 7,475,773 B2 * | 1/2009 | Lancesseur et al. | 220/789 |
| 2003/0173365 A1 | 9/2003 | Stickel | |
| 2004/0206398 A1 | 10/2004 | Olshanetsky et al. | |

FOREIGN PATENT DOCUMENTS

| | | |
|---|---|---|
| DE | 20019968 U1 | 2/2001 |
| DE | 102005011026 A1 | 9/2006 |
| EP | 1216874 A2 | 6/2002 |
| WO | 2011045007 A2 | 4/2011 |

* cited by examiner

*Primary Examiner* — Andrew Perreault
(74) *Attorney, Agent, or Firm* — Quinn Law Group, PLLC

(57) ABSTRACT

An assembly mountable to a fuel tank and connectable to a carbon canister includes a housing defining an internal cavity. A vapor vent valve is configured to permit fluid communication from the fuel tank through the vapor vent valve from an inlet to an outlet, and in all cases is isolated from the internal cavity so that fluid flows through the vapor vent valve from the inlet to the outlet without fluid communication with the internal cavity. A first vent line connects the outlet of the vapor vent valve with a first port of the housing. A second vent line connects a second port of the housing with the carbon canister. At least a portion of the first vent line is above a predetermined liquid fuel level within the tank when the assembly is mounted to the fuel tank and tilted at up to a predetermined angle.

16 Claims, 3 Drawing Sheets

ASSEMBLY WITH VAPOR VENT VALVE AND LIQUID TRAP FOR STATIC LEAK PREVENTION IN VAPOR CONTROL SYSTEM

TECHNICAL FIELD

The invention relates to an assembly for a fuel tank vapor control system that prevents liquid fuel from reaching a carbon canister.

BACKGROUND

Modern vehicles with internal combustion engines fueled by gasoline typically have a vapor control system that directs fuel vapor from a fuel tank vapor space to a carbon canister, rather than allowing the vapor to vent during refueling or during periods in which the fuel tank temperature rises. The canister is periodically purged so that the vapors are burned by the vehicle engine. If such a vehicle is parked on a grade for a prolonged period, liquid fuel may pass through the vapor vent valve to the canister, decreasing the performance ability of the canister.

SUMMARY

An assembly mountable to a fuel tank and connectable to a carbon canister includes a housing defining an internal cavity. The housing may be referred to as a liquid trap, and has a first port and a second port both in fluid communication with the internal cavity. A vapor vent valve having an inlet and an outlet is configured to permit fluid communication from the fuel tank through the vapor vent valve from the inlet to the outlet. The vapor vent valve may be integral with the housing (e.g., mounted to the housing or formed integrally with the housing), or separate from the housing, but in all cases is isolated from the internal cavity so that fluid flows through the vapor vent valve from the inlet to the outlet without fluid communication with the internal cavity. A first vent line connects the outlet of the vapor vent valve with the first port of the housing. A second vent line connects to the second port with the carbon canister. Fluid flow from the fuel tank to the second vent line is thus by a path through the vapor vent valve, then through the first vent line, and then through the housing. As used herein, "fluid flow" refers to vapor flow. The first vent line is configured such that at least a portion of the first vent line is above a predetermined liquid fuel level within the tank when the assembly is mounted to the fuel tank and tilted at up to a predetermined angle. This prevents liquid fuel from reaching the carbon canister when the second vent line is operatively connected to the carbon canister. That is, by utilizing the principle that, without external pressure being applied, the liquid level in a submerged component that allows liquid into as well as out of the component cannot be higher than the liquid level outside of the component. Because liquid fuel can pass into as well as out of the first vent line through the vapor vent valve, if the first vent line is configured so that at least a portion of the passage in the first vent line is above the fluid level, liquid cannot reach the canister. The only route for liquid fuel to pass to the internal cavity of the housing is through the vapor vent valve and the first vent line. The routing and length of the first vent line can be specifically designed for each particular fuel tank application so that at least one part of the first vent line is always above a predetermined fuel level when the tank is tilted at up to a predetermined angle.

The above features and advantages and other features and advantages of the present invention are readily apparent from the following detailed description of the best modes for carrying out the invention when taken in connection with the accompanying drawings.

DETAILED DESCRIPTION

Figure 1:
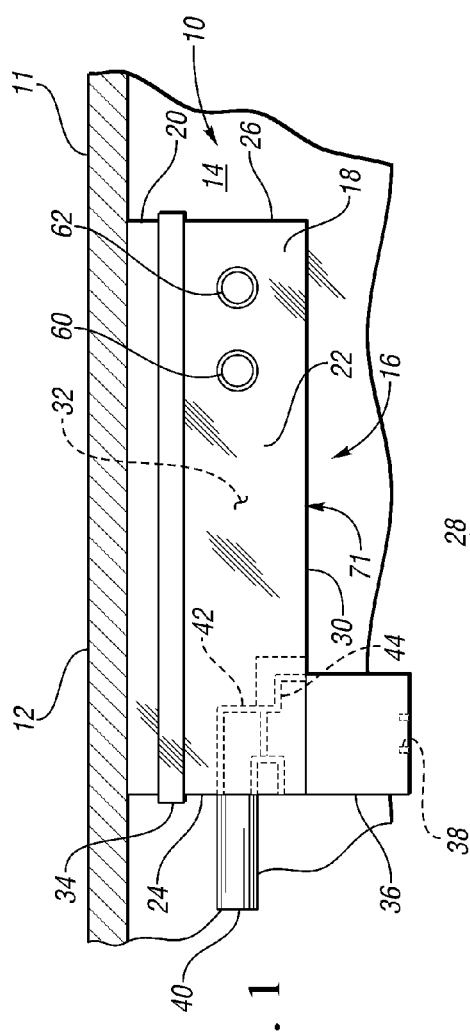
FIG. 1 is a schematic partially cross-sectional fragmentary side view illustration of a portion of an assembly with an integrated liquid trap housing and vent valve mounted in a fuel tank.

Referring to the drawings, wherein like reference numbers refer to like components throughout the several views, FIG. 1 shows a portion of one embodiment of a vapor control system 10 for a vehicle fuel tank 11. The fuel tank 11 has an upper wall portion 12 partially defining an internal space 14. An integrated vent valve and liquid trap assembly 16 is mounted to the upper wall portion 12 in the internal space 14. The fuel tank 11 holds liquid fuel. Fuel vapor forms in a vapor space above the fuel level, and is routed to a carbon canister 17 operatively connected to the assembly 16 (shown in phantom in FIG. 2) to prevent vapor emissions. As further discussed herein, the assembly 16 eliminates the possibility of liquid fuel from reaching the carbon canister 17 when the tank 11 is tilted at up to a predetermined angle, such as when a vehicle to which the tank 11 is mounted is parked on a grade.

The assembly 16 includes a housing 18 and a cap 20. The cap 20 is mounted to the upper wall portion 12 of the fuel tank 11 by any known means that maintains the integrity of the fuel tank while meeting applicable emissions standards. For example, in FIG. 1, the upper wall portion 12 may be a top half shell of the fuel tank. The cap 20 may be pressed to the upper wall portion 12 after forming the upper wall portion 12, while the upper wall portion 12 is still relatively hot and viscous. This will cause the cap 20 to melt into the upper wall portion 12 so that it effectively becomes hot welded to the upper wall portion 12. In other embodiments, the cap 20 could have flanges that the hot and viscous upper wall portion 12 flow through to weld the cap to the upper wall portion 12. In still other embodiments, the cap 20 could be formed with an undercut, and the upper wall portion 12 could flow into the undercut when still hot and viscous to weld the cap 20 to the upper wall portion 12. In some applications, the cap 20 could also be mounted through an opening in the upper wall portion 12, rather than to an inner surface of the upper wall portion 12, and hot welded to the upper wall portion 12 at the opening.

Figure 6:
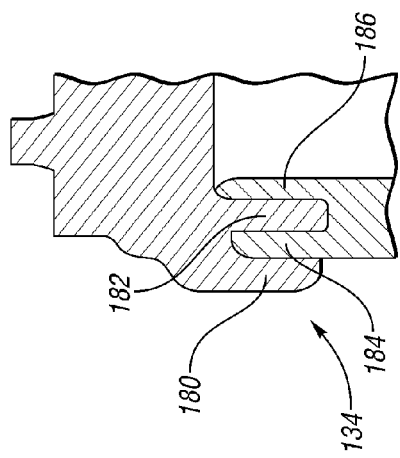
FIG. 6 is a close-up fragmentary, cross-sectional illustration of a portion of the labyrinth seal.
Figure 7:
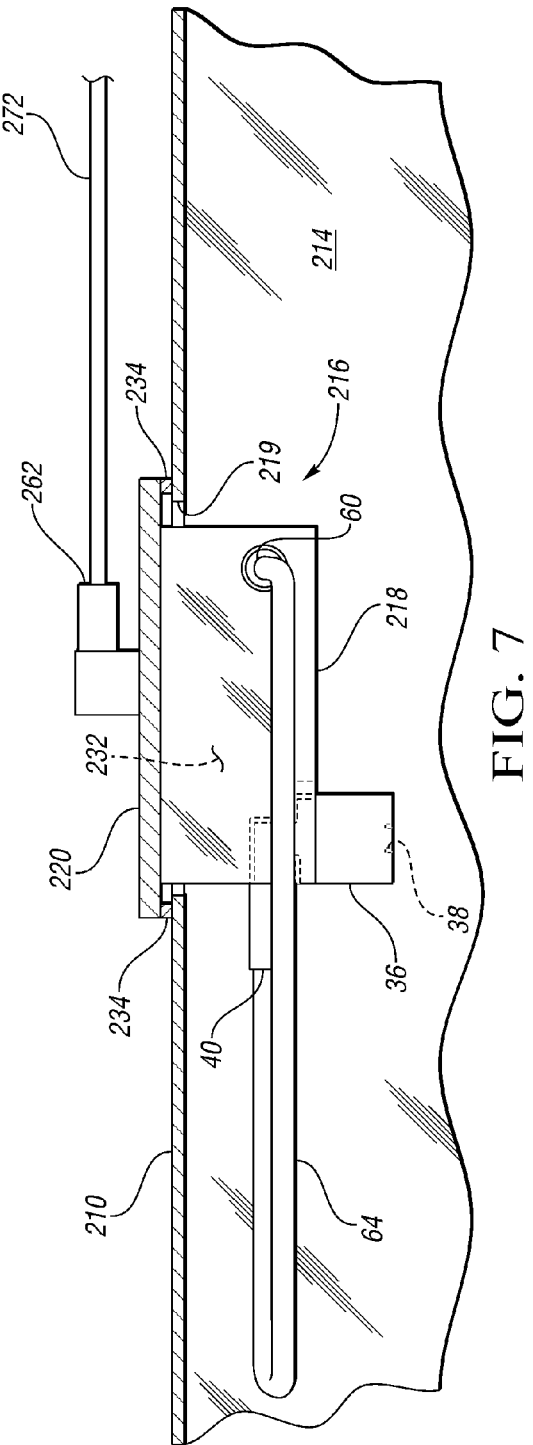
FIG. 7 is a schematic partially cross-sectional fragmentary side view illustration of another embodiment of an assembly with an integrated liquid trap housing and vent valve mounted in a fuel tank.

The housing 18 may be injection-molded plastic or any other material that is impervious to both liquid and vapor fuel for which the fuel tank 11 is designed. The housing 18 includes four side walls 22, 24, 26, 28, and a bottom wall 30. The cap 20 is sealingly engaged with the side walls 22, 24, 26, 28 as further described herein so that the housing 18 and cap 20 together have a generally rectangular box-like shape and define an internal cavity 32. The housing 18 may have a variety of other alternative shapes. In the embodiment of FIG. 1, the cap 20 is sealed to the side walls 22, 24, 26, 28 with an O-ring 34. In other embodiments, such as is shown and discussed with respect to FIGS. 5 and 6 below, a labyrinth seal may be used. In still other embodiments, such as is shown in FIG. 7, a hot weld is used. All other forms of welding may be used to connect and seal the housing 18 to the cap 20.

The assembly 16 also includes one or more vapor vent valves, such as vapor vent valve 36. In the embodiment of FIGS. 1-4, the vapor vent valve 36 is mounted to the housing 18, and may be integrally formed with the housing 18. In other embodiments, the vapor vent valve 36 is not mounted to the housing 18. For example, the vapor vent valve 36 could be separately mounted to the upper wall portion 12. In all instances, however, the vapor vent valve 36 and housing 18 are configured so that any liquid flow through the vapor vent valve 36 is not in fluid communication with the internal cavity 32. The vapor vent valve 36 has an inlet 38 that is open to the vapor space 14. Fluid flows through the vapor vent valve 36 from the inlet 38 to an outlet 40 of the vapor vent valve 36 formed in the side wall 24. The housing 18 has additional wall structure 42 that defines the boundaries of the internal space 32 to isolate the vapor vent valve 36 from the internal space 32. Still another possibility is that the valve housing 44 itself isolates the valve 36 from the internal cavity 32.

Figure 8:
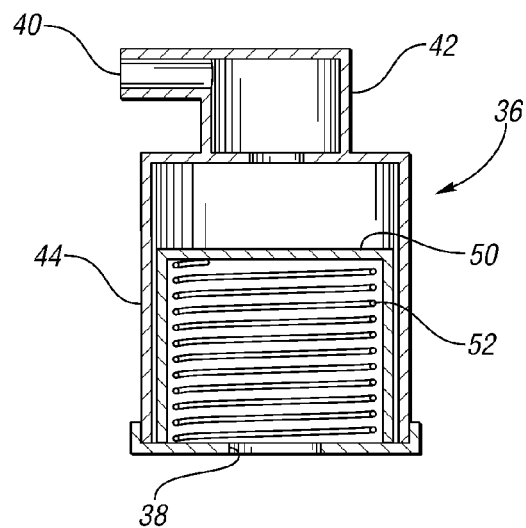
FIG. 8 is a schematic cross-sectional illustration of one embodiment of the vent valve of FIG. 1.

The vapor vent valve 36 may be any type of vent valve that controls venting of vapor from the internal space 14 to the canister 17. One embodiment of a vapor vent valve 36 is shown in FIG. 8. The vapor vent valve 36 has a float 50 that rises with liquid level and eventually prevents liquid from passing from the inlet 38 to the outlet 40. A spring 52 helps to keep the float 50 in a position that substantially blocks the outlet 40 when the valve 36 is turned ≧90 degrees. Vapor passes from the inlet 38 to the outlet 40 around the sides of the float 50. Optionally, there could also be slots in the side of the valve housing 44 that are open to the internal space 14 to vent vapor past the float 50. Even with the float 50 and spring 52, some static leakage from the inlet 38 to the outlet 40 can occur past the float 50 when a vehicle with the fuel tank 11 and the assembly 16 (but without both the vent line 64 and liquid ports 60, 62 as discussed below) is parked on a grade for a prolonged period, such as, by way of non-limiting example, over a period of several weeks. Many other forms of vapor vent valves may be used, including diaphragm valves.

The housing 18 is formed with a first port 60 and a second port 62. In the embodiments of FIGS. 1-4, the first port 60 and the second port 62 are both formed in the side wall 22. In other embodiments, the first port 60 and the second port 62 may be formed in any of the side walls 22, 24, 26 and 28 or in the bottom wall 30, and the first port 60 and the second port 62 may be formed in different ones of the walls. The assembly 16 includes a first vent line 64 that connects the valve outlet 40 with the first port 60. The first vent line 64 is a hollow tube that provides a path for fluid communication from the valve outlet 40 to the first port 60, thus allowing fluid that vents through the valve 36 to pass from the vapor space 14 to the internal cavity 32. The first vent line 64 may be a plastic or a metal tube impervious to the fuel in the tank 10.

The first vent line 64 has a first portion 66, a second portion 68 generally parallel with the first portion 66, and a third portion 70 that connects the first portion 66 with the second portion 68. Although shown slightly offset vertically from one another for purposes of illustration in FIGS. 3 and 4, the first portion 66 and the second portion 68 may be at the same level as one another when the tank 11 is level (e.g., at the same level as the center axis of the valve outlet 40 in FIG. 1) and extending generally parallel with the surface 70 of the bottom portion 30. As is apparent in FIG. 2, the first vent line 64 is generally U-shaped. In other embodiments, the first vent line 64 may have other shapes.

Figure 2:
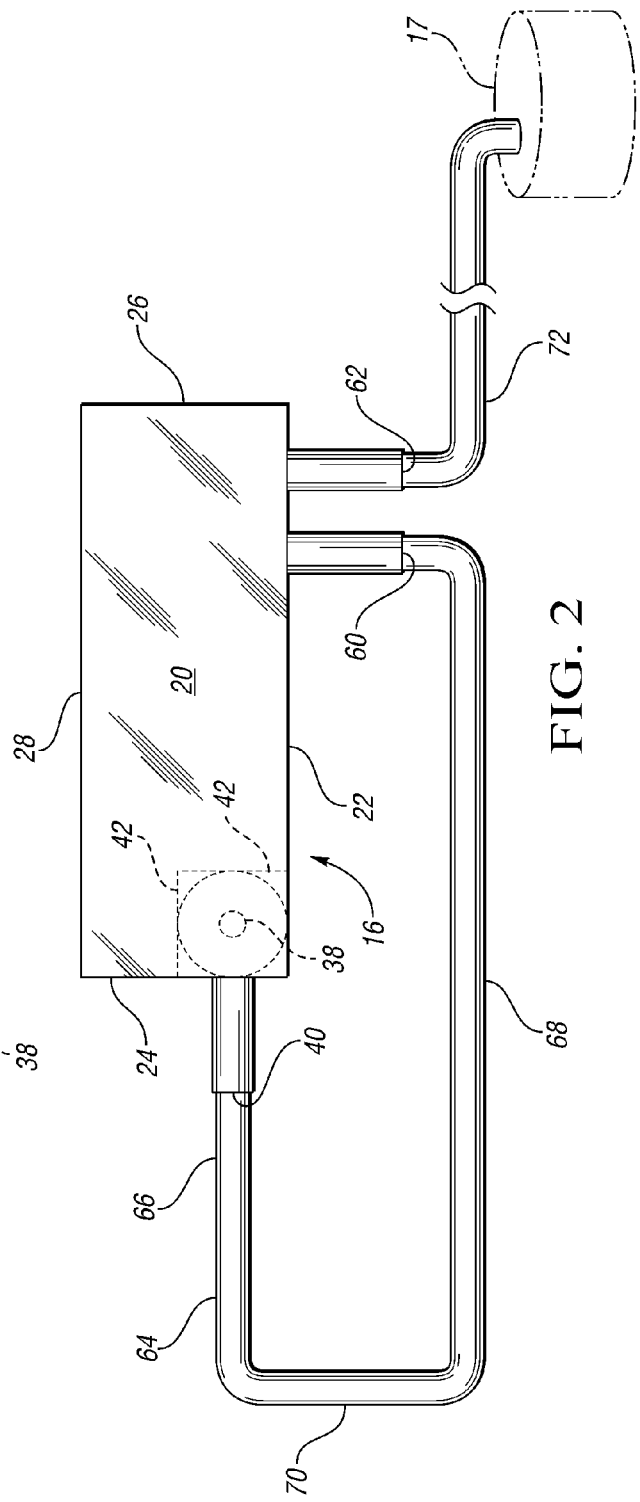
FIG. 2 is a schematic plan view illustration of the assembly of FIG. 1 removed from the fuel tank and connected with a carbon canister that is shown in phantom.

Still referring to FIG. 2, the assembly 16 also includes a second vent line 72 that is connected to the second port 62 and extends to and connects with the canister 17. The second vent line 72 is also a hollow tube, and provides a path for fluid communication from the second port 62 to the canister 17. The second vent line 72 must pass through one of the walls of the tank 11 to reach the canister 17, which may be located near an engine on the vehicle, or elsewhere on the vehicle. The vent line 72 may connect with a different vent line that leads from the tank 11 to the canister 17, operatively connecting the second vent line 72 to the canister 17. Both of the first and second vent lines 64 and 72 may be any material that is impervious to liquid and vapor fuel. In some embodiments, intermediate valves and orifices may be inserted along the first vent line 64 or the second vent line 72. However, in all embodiments, the single path by which fluid communication is established from the vapor space 14 to the canister 17 is from the valve inlet 38, through the valve 36 to the valve outlet 40, then through the first vent line 64 to the internal cavity 32 of the housing 18, then through the second vent line 72 to the canister 17. The vent valve 36 and first vent line 64 establish the only route by which fluid communication is established between the vapor space 14 and the internal cavity 32.

Figure 3:
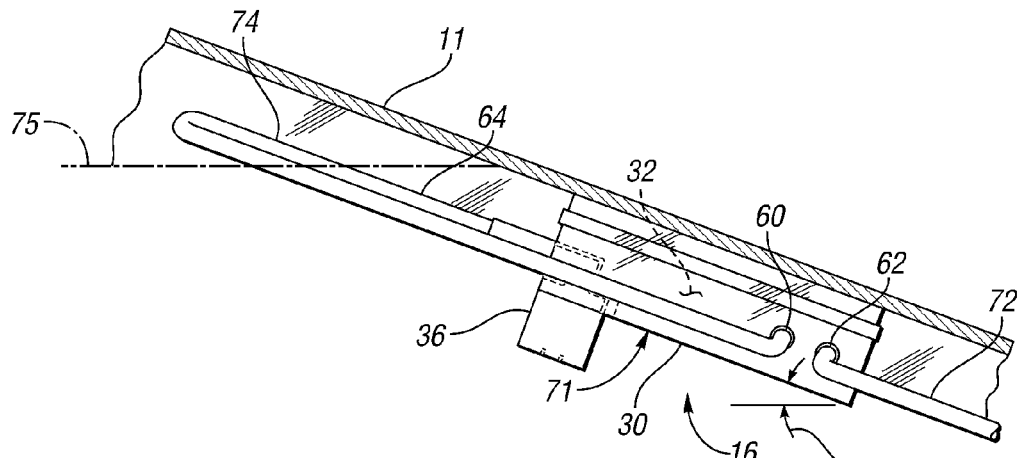
FIG. 3 is a schematic fragmentary partially cross-sectional fragmentary side view illustration of the fuel tank and assembly tilted in one direction at a predetermined angle.
Figure 4:
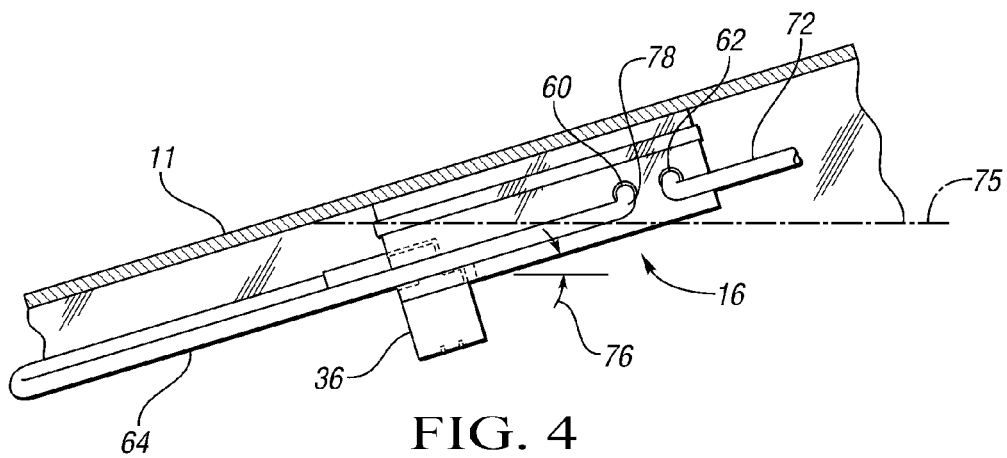
FIG. 4 is a schematic fragmentary partially cross-sectional fragmentary side view illustration of the fuel tank and assembly tilted in another direction at the predetermined angle.

Referring to FIG. 3, the first vent line 64 is sized sufficiently so that it extends far enough laterally from the tank 11 so that at least a portion 74 of the first vent line 64 remains above a liquid fuel level 75 in the tank 11 when the tank 11 is tilted at up to a predetermined angle 76 from a level position, such as may be defined with reference to the surface 71 of the bottom wall 30, or with reference to another surface. As shown in FIG. 4, when the tank 11 is tilted in a different direction to the same degree (i.e., by the predetermined angle 76), a different portion 78 of the first vent line 64 remains above the liquid fuel level 75. In both instances, the vent valve 36 is submerged in liquid fuel. If the fuel tank 11 remains in the tilted position of FIG. 3 or of FIG. 4 for an extended period of time, such as if a vehicle is parked on a grade, static leakage may occur, allowing liquid fuel to pass through the vent valve 36. However, liquid inside of the first vent line 64 can never be higher than the level of liquid outside of the vent line 64 (i.e., the liquid fuel level 75). As such, liquid fuel cannot reach the internal cavity 32 nor reach the second vent line 72, even when these items are submerged below the fuel level 75. Liquid fuel thus cannot pass to the canister 17. The first vent line 64 can be routed and sized for different fuel tank applications to achieve this effect. More than one vent valve, inlet port, and outlet port may be used.

Figure 5:
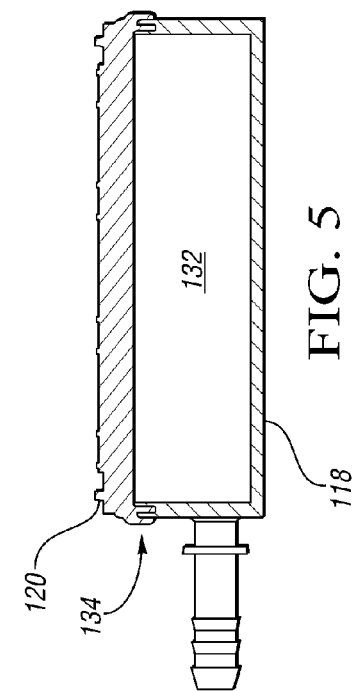
FIG. 5 is a schematic cross-sectional illustration of another embodiment of a liquid trap housing, for use with the assembly of FIGS. 1-4, having a cap forming a labyrinth seal to sidewalls of the housing.

FIG. 5 is a partial illustration of another embodiment of a housing 118 defining an internal cavity 132. A vapor vent valve may be mounted to the housing 118, or may be separate, and is in fluid communication with a first port (not shown) in the housing 118 via a first vent line extending between the vapor vent valve and the first port. A second port (not shown)

extends to the canister 17 of FIG. 2. The cap 120 is mounted to the upper portion 12 of the fuel tank 11 of FIG. 1 by any of the methods described. The cap 120 is then sealed to the housing 118 with a labyrinth seal 134. The labyrinth seal 134 is shown in closer detail in FIG. 6 and includes ridges 180, 182 of the cap 120 that interfit with ridges 184, 186 of the housing 118 at an upper perimeter of the housing 118. The cap 120 is assembled to the housing 118 before the entire assembly 16 gets mounted into the fuel tank 11 using any possible attachment method. Yet the cap 120 could also be interfit with the housing 118 while the cap 120 is still hot and viscous after mounting to the tank 11 to aid in sealing the cap 120 to the housing 118.

FIG. 7 shows another embodiment of an assembly 216 configured to function the same as assembly 16. In this embodiment, a fuel tank 210 has an opening 219 at which a cap 220 is hot welded at weld areas 234. The cap 220 has an integrated second port 262, rather than a second port in housing 218. The second port 262 is connected to a second vent line 272 that is in fluid communication with the canister 17 of FIG. 2. The housing 218 may be integrally formed with the cap 220, such as by injection molding. Alternatively, the housing 218 may be melted to the cap 220 by hot welding, an O-ring seal, a labyrinth seal or otherwise to form an internal cavity 232 similar to cavity 32 of FIG. 1. The valve 36 with inlet 38 open to the fuel tank interior space 214 has an outlet 40 connected with first vent line 64 as described above. The valve 36 is isolated from the internal cavity 232, so that fluid passes from the inlet 38 to the outlet 40 without entering into the cavity 232. In FIG. 7, the first vent line 64 is shown in slightly perspective view for purposes of illustration. However, as discussed with respect to FIGS. 3 and 4, the parallel portions 66, 68 of the first vent line 64 are level with one another in one embodiment. The first vent line 64 has a portion that is always above a predetermined liquid fuel level when the tank 210 is tilted at up to a predetermined angle.

While the best modes for carrying out the invention have been described in detail, those familiar with the art to which this invention relates will recognize various alternative designs and embodiments for practicing the invention within the scope of the appended claims.

The invention claimed is:

1. An assembly mounted to a fuel tank within an internal space in the fuel tank and connected to a carbon canister comprising:
   a housing within the internal space and defining an internal cavity; wherein the housing has a first port and a second port both in fluid communication with the internal cavity;
   a vapor vent valve within the internal space having an inlet and an outlet; wherein the vapor vent valve permits fluid communication from the fuel tank through the vapor vent valve from the inlet to the outlet; wherein the vapor vent valve is isolated from the internal cavity such that fluid flows through the vapor vent valve from the inlet to the outlet without fluid communication with the internal cavity;
   a first vent line within the internal space, connecting the outlet of the vapor vent valve with the first port;
   a second vent line within the internal space and connected to the second port and operatively connected with the carbon canister, fluid flow from the fuel tank to the second vent line thereby passing through the vapor vent valve, then through the first vent line, and then through the housing;
   wherein at least a portion of the first vent line is above a predetermined liquid fuel level within the tank when the fuel tank and tilted at up to a predetermined angle, thereby preventing liquid fuel from reaching the carbon canister; and wherein the first vent line extends from the vapor vent valve outlet at the housing to the first port.

2. The assembly of claim 1, wherein the housing includes a plurality of walls and a cap sealed to the plurality of walls such that the plurality of walls and the cap define the internal cavity.

3. The assembly of claim 2, further comprising:
   an O-ring sealing the plurality of walls to the cap.

4. The assembly of claim 2, wherein the cap forms a labyrinth seal that sealingly engages with the plurality of walls.

5. The assembly of claim 2, wherein the vapor vent valve is mounted to the housing; wherein the plurality of walls includes side walls; and wherein at least one of the ports and the vapor vent valve outlet are formed in the side walls.

6. The assembly of claim 5, wherein the plurality of walls includes a bottom wall connected to the side walls; wherein the vapor vent valve extends from the bottom wall.

7. The assembly of claim 1, wherein the first vent line has a first portion, a second portion generally parallel with the first portion, and a third portion connecting the first and the second portions so that the first vent line substantially forms a u-shape.

8. The assembly of claim 7, wherein the first vent line extends from the housing generally parallel with a bottom surface of the housing when the assembly is mounted to the fuel tank.

9. The assembly of claim 1, wherein the housing includes a plurality of side walls, a bottom wall, and a cap sealed to the plurality of side walls such that the plurality of side walls, the bottom wall, and the cap define the internal cavity; wherein the first port and the second port are in a single one of the side walls.

10. A vapor control system including a fuel tank that defines an internal space, the vapor control system comprising:
    a carbon canister;
    a housing mounted to the fuel tank within the internal space; wherein the housing defines an internal cavity and has a first port and a second port both in fluid communication with the internal cavity;
    a vapor vent valve mounted to the housing within the internal space and having an inlet open to the internal space and an outlet; wherein the vapor vent valve permits fluid communication from the fuel tank through the vapor vent valve from the inlet to the outlet and is isolated from the internal cavity such that fluid flows through the vapor vent valve from the inlet to the outlet without fluid communication with the internal cavity;
    a first vent line within the internal space and connecting the outlet of the vapor vent valve with the first port;
    a second vent line within the internal space and operatively connecting the second port with the carbon canister, fluid flow from the fuel tank to the carbon canister thereby passing through the vapor vent valve to the first vent line, then though the first vent line to the housing, and then through the housing to the second vent line;
    wherein at least a portion of the first vent line is above a predetermined liquid fuel level within the tank when the housing is tilted at up to a predetermined angle, thereby preventing liquid fuel from reaching the carbon canister; and wherein the first vent line extends from the vapor vent valve outlet at the housing to the first port.

11. The vapor control system of claim 10, wherein the housing includes a plurality of walls and a cap sealingly connected to the plurality of walls such that the plurality of walls and the cap define the internal cavity.

12. The vapor vent control system of claim 11, wherein the plurality of walls includes side walls with the cap sealed to the side walls; wherein the plurality of walls further includes a bottom wall connected to the side walls opposite the cap; wherein the vapor vent valve extends from the bottom wall; and wherein at least one of the ports and the vapor vent valve outlet are formed in the side walls.

13. The vapor vent control system of claim 10, wherein the first vent line has a first portion, a second portion generally parallel with the first portion, and a third portion connecting the first and the second portions so that the first vent line substantially forms a u-shape.

14. The vapor control system of claim 10, wherein the housing includes a plurality of side walls, a bottom wall, and a cap sealed to the plurality of side walls such that the plurality of side walls, the bottom wall, and the cap define the internal cavity; wherein the first port and the second port are in a single one of the side walls.

15. An assembly mounted to a fuel tank within an internal space of the fuel tank and connected to a carbon canister comprising:

a housing within the internal space having a plurality of walls and a cap defining a labyrinth seal engaged with the plurality of walls to define an internal cavity and having a first port and a second port in the plurality of walls;

a vapor vent valve mounted to the housing within the internal space and having an inlet and an outlet; wherein the vapor vent valve permits fluid communication from the fuel tank through the vapor vent valve from the inlet to the outlet; wherein the vapor vent valve is isolated from the internal cavity such that fluid flows through the vent valve from the inlet to the outlet without fluid communication with the internal cavity;

a first vent line within the internal space and connecting the outlet of the vapor vent valve with the first port; wherein the first vent line has a first portion, a second portion generally parallel with the first portion, and a third portion connecting the first and the second portions so that the first vent line substantially forms a u-shape and extends from the housing generally parallel with a bottom surface of the housing;

a second vent line within the internal space, connected to the second port and operatively in fluid communication with the carbon canister; and wherein at least a portion of the first vent line is above a predetermined level within the tank when the tank is tilted at up to a predetermined angle, thereby preventing liquid fuel from reaching the carbon canister through the second vent line; and wherein the first vent line extends from the vapor vent valve outlet at the housing to the first port.

16. The assembly of claim 15, wherein the plurality of walls includes side walls and a bottom wall; wherein the first port and the second port are in a single one of the side walls.

* * * * *